(12) United States Patent  
Sur et al.

(10) Patent No.: US 9,176,550 B2  
(45) Date of Patent: Nov. 3, 2015

(54) THERMALLY DOWNWARD SCALABLE SYSTEM

(75) Inventors: Biswajit Sur, San Jose, CA (US); Eric Distefano, Livermore, CA (US); James G. Hermerding, II, Vanvouver, WA (US); Eugene P. Matter, Folsom, CA (US); John P. Wallace, Portland, OR (US); Guy M. Therien, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 695 days.

(21) Appl. No.: 12/977,848

(22) Filed: Dec. 23, 2010

(65) Prior Publication Data

US 2012/0166842 A1    Jun. 28, 2012

(51) Int. Cl.
*G06F 1/32* (2006.01)
*G06F 1/20* (2006.01)
*G06F 1/26* (2006.01)

(52) U.S. Cl.
CPC  *G06F 1/206* (2013.01); *G06F 1/26* (2013.01); *G06F 1/324* (2013.01); *G06F 1/3206* (2013.01); *G06F 1/3296* (2013.01); *Y02B 60/1217* (2013.01); *Y02B 60/1275* (2013.01); *Y02B 60/1285* (2013.01)

(58) Field of Classification Search
CPC ......... G06F 1/206; G06F 1/26; G06F 1/3206; G06F 1/324; G06F 1/3296; Y02B 60/1217; Y02B 60/1285; Y02B 60/1275

See application file for complete search history.

(56) References Cited

U.S. PATENT DOCUMENTS

| | | | |
|---|---|---|---|
| 5,710,975 A * | 1/1998 | Bernhardt et al. | 340/7.22 |
| 6,904,004 B1 * | 6/2005 | Van der Meulen | 369/30.28 |
| 6,947,035 B1 * | 9/2005 | Shiraga | 345/211 |
| 7,143,300 B2 | 11/2006 | Potter et al. | |
| 7,596,708 B1 | 9/2009 | Sameer et al. | |
| 7,702,938 B2 * | 4/2010 | Ha | 713/323 |
| 2004/0003309 A1 | 1/2004 | Cai et al. | |
| 2005/0212781 A1 | 9/2005 | Clapper | |
| 2006/0279152 A1 * | 12/2006 | Ha | 310/114 |
| 2006/0288243 A1 | 12/2006 | Kim | |
| 2007/0157041 A1 | 7/2007 | Youngs | |
| 2007/0285428 A1 * | 12/2007 | Foster et al. | 345/503 |
| 2010/0162019 A1 | 6/2010 | Kumar et al. | |
| 2012/0050553 A1 * | 3/2012 | Nishimura | 348/208.5 |

OTHER PUBLICATIONS

International Search Report and Written Opinion received for PCT Patent Application No. PCT/US2011/064477, mailed on Jul. 2, 2012, 10 pgs.

Office Action and Search Report received for Chinese Patent Application No. 201180061433.2, mailed Mar. 25, 2015, 9 pages.

\* cited by examiner

*Primary Examiner* — M Elamin

(74) *Attorney, Agent, or Firm* — Kacvinsky Daisak Bluni PLLC

(57) ABSTRACT

An apparatus may comprise a power management system. Other embodiments are described and claimed.

19 Claims, 6 Drawing Sheets

THERMALLY DOWNWARD SCALABLE SYSTEM

BACKGROUND

A central consideration in operation of computer and communication devices, and in particular portable devices, is providing an optimal ergonomic experience to a user. For example, ergonomic considerations associated with computing, communication, and entertainment systems include the touch-temperatures and audible system noise levels during system use. Especially in portable systems, an uncomfortable touch-temperature (for example, the temperature of a chassis, skin, touch-screen, or track-point) or exhaust air temperature, or an annoying system noise level may distract from the user experience, even for the sleekest systems. Given the highly integrated nature of many portable system designs, often the vectors of performance, noise, and comfort can be divergent, and each may constrain the other.

For example, in order to achieve highest performance, such systems may be designed to operate in the range of the maximum allowable power limit. Normal operation of such systems may entail running processors, controllers and other heat-generating devices under high active power conditions in which tens of watts or hundreds of watts may be generated by a single device or combination of devices, leading to excessive heating and/or audible noise associated with cooling devices. Some attempts have been made to manage power to optimize battery life in portable systems, including use of a so-called Low Frequency Mode (LFM), in which processors may be operated at a lower frequency than a maximum frequency afforded by the processor. However, the power consumed during LFM operation has scaled upward significantly in recent generations, leading to increased thermal output of device platforms, even those operating under LFM power. It is with respect to these and other considerations that the present improvements have been needed.

DETAILED DESCRIPTION

Figure 1A:
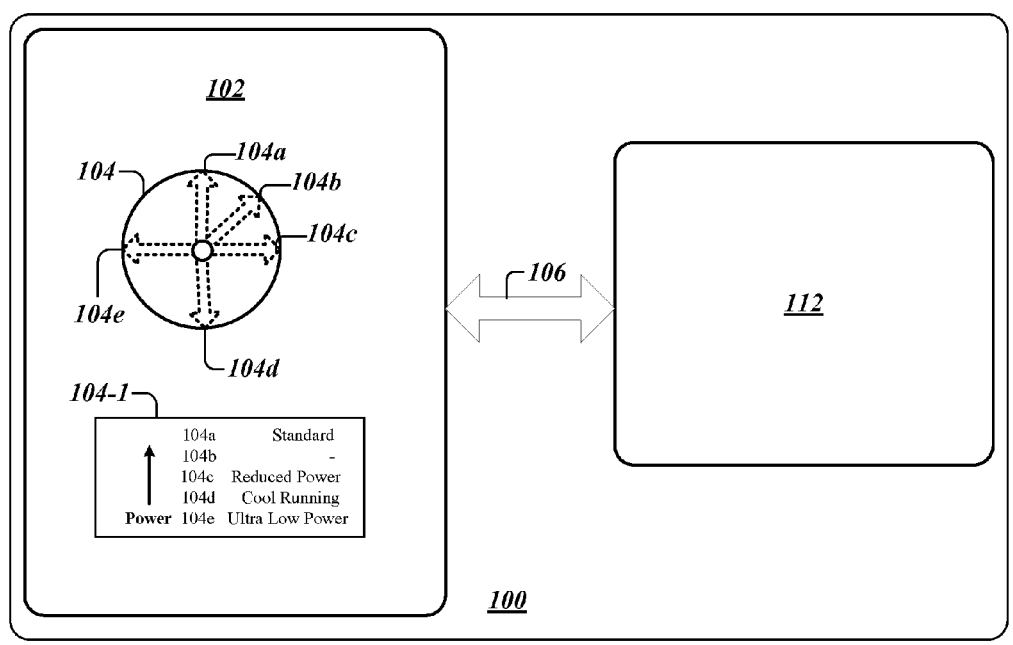
FIG. 1a illustrates one embodiment of a power management system.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

As is known, thermal dissipation may manifest itself as either a temperature increase of the device itself or of the system of which it is a part or as acoustic noise arising from the use of cooling fans to remove the heat from the device and/or system. Various embodiments disclosed herein provide a system that includes a "knob" or combination of "knobs" that may be configurable to a Low Power Mode (LPM) to manage power and thereby thermal dissipation and audible noise output from devices in an electronic device platform. Device platforms may include a computing apparatus, a communications apparatus, an electronic entertainment apparatus, or hybrid apparatus, among other devices. The term "knob" or "power knob" as used herein, generally refers to an element or combination of elements that may be employed to vary operation of power modes or states of a device or set of devices, such as processors, controllers, memory, and the like. In various embodiments, the knobs are provided in hardware, software, or a combination of hardware and software.

The knobs or devices of the present embodiments may be described as configurable, meaning that the knobs (and devices) can be adjusted between different settings that correspond to different power modes for operation of devices. In particular, the knobs may be arranged to work with a device platform in a manner that is incremental and does not diminish other inherent useful characteristics of the product (device platform), but rather, adds new useful scalable features. In various embodiments described below, the power knobs may afford downward scalability of power, which results in reducing heat that may manifest itself as an increase in temperature and/or noise output from a device platform that may normally operate in a standard mode at maximum power.

The knobs may be arranged for convenient reversible downward and upward scalability of heat, power, or noise depending on the state of a device platform.

Embodiments may be described herein as related to scaling power levels or thermal output of levels in a device or device platform. It is to be noted that the electrical power of an electronic device generally is directly proportional to the thermal output because a large fraction of the power generated may be dissipated as heat (some power may be dissipated to operate mechanical devices such as fans, hard drives, and audio devices). Accordingly, the terms "power" or "power mode" may generally signify the electrical or thermal power unless otherwise indicated.

In accordance with various embodiments, the configurable knobs may reduce power levels during an active mode of operation of a computer or similar device where limitation of user annoyance may be most important. In particular, the configurable knobs may be reversibly set to a "low power" mode or modes during active operation of one or more devices in device platforms, such as computers, communications apparatus, hybrid apparatus, and other apparatus.

In some embodiments, a thermally configurable knob may facilitate operation of a multi-function or multi-element device in a system that is designed for operation at a reduced cooling level, including reduced fan speeds or in an operating environment having reduced cooling capability. This may be accomplished by establishing discrete device configurations to which the multi-element device may fit within the system and/or operating environment. The multifunction device may be then scaled up to fit in a new environment, such as that provided from a cooler ambient or from additional cooling provided by another device or by reduction of power elsewhere in the system.

In some embodiments, changes in the knob settings, that is, changes in power modes of operation of a system, may be triggered by system hardware, while in other embodiments, an environmental element, such as a sensed temperature or noise level, may trigger changes in the knob settings.

In some embodiments, the platform devices include a processor or multiprocessor core configuration. In some embodiments, the platform devices may include input/output (I/O) devices, such as a processor control hub (PCH), northbridge, or southbridge. In some embodiments, the platform devices include wireless devices. In some embodiments, the platform devices include memory devices, graphics processor(s), and display electronics. In some embodiments, the knobs are configurable to control operating parameters in one or more components that may include core processors, graphics processors, I/O devices, wireless devices, memory devices, display controllers, and chipset devices.

Some embodiments provide a set of one or more "knobs" that form at least part of a user interface, such as a display screen, discrete function buttons, indicating device, keypad or other interface. Some embodiments provide a menu or other user interface that can receive input and send signals to adjust operating parameters in a set of devices to change their operating mode.

In some embodiments, a knob or set of knobs offers a multiplicity of power modes for a set of platform devices that are associated with a multiplicity of thermal output levels of the set of platform devices. In some embodiments, the operation of one or more devices may be individually set by setting one or more respective knobs, either in hardware or software, in accordance with a desired thermal output for a platform. In some embodiments, the operation of the multiplicity of devices may be subsequently automatically controlled according to a configuration (power mode) set by a user through individual adjustment of a knob or knobs.

In some embodiments, a power management module is arranged to control a multiplicity of operating parameters associated with operation of one or more devices of an electronic device platform. The power (or thermal) management module may provide a multiplicity of settings (power modes) that may each correspond to a different power level in the device platform and each result in a different thermal (heat) output from the one or more devices. In some embodiments, the power management module may be arranged to accept user input to vary one or more knobs so as to change the level of thermal output from the one or more devices.

In some embodiments, a power management module may be arranged to vary the settings in one or more devices according to user input specific for the one or more knobs. In some embodiments, the power management module may be arranged to vary the settings in one or more devices according to a selected thermal level, which may be based on a user selection. Other embodiments are described and claimed.

In particular embodiments, a set of power knobs (or power knobs) provides the ability to downscale power used by a device platform in a series of different power levels from a maximum (turbo) power level to a minimum power level in which the control knobs are set to produce minimum output power in their respective controlled devices.

FIG. 1a depicts schematically one embodiment of a power management system 100 that may be used to provide downward scalability of thermal output in a device platform 112. The embodiment of FIG. 1a may provide a power management module 102 that is operable to vary the operating conditions in one or more devices in device platform 112. The power management module 102 may include a power "knob" 104 described in more detail below. In various embodiments, power knob 104 may be operable to vary power levels (modes) in device platform 112. In some embodiments, power knob 104 may include a visible interface such as a listing, a menu or table 104-1 that provides a set of selectable modes 104a-e, which may be designated, for example, as "Standard," "Reduced Power," and "Ultra Low Power (ULP)," as well as other modes. In some embodiments, the power management module 102 may be included within a device platform, such as a computer or other electronic apparatus. In some embodiments, when setting are varied using knob 104, a signal may be sent to device platform 112 through link 106 causing one or more devices (not shown) in device platform 112 to change operating modes.

Figure 1B:
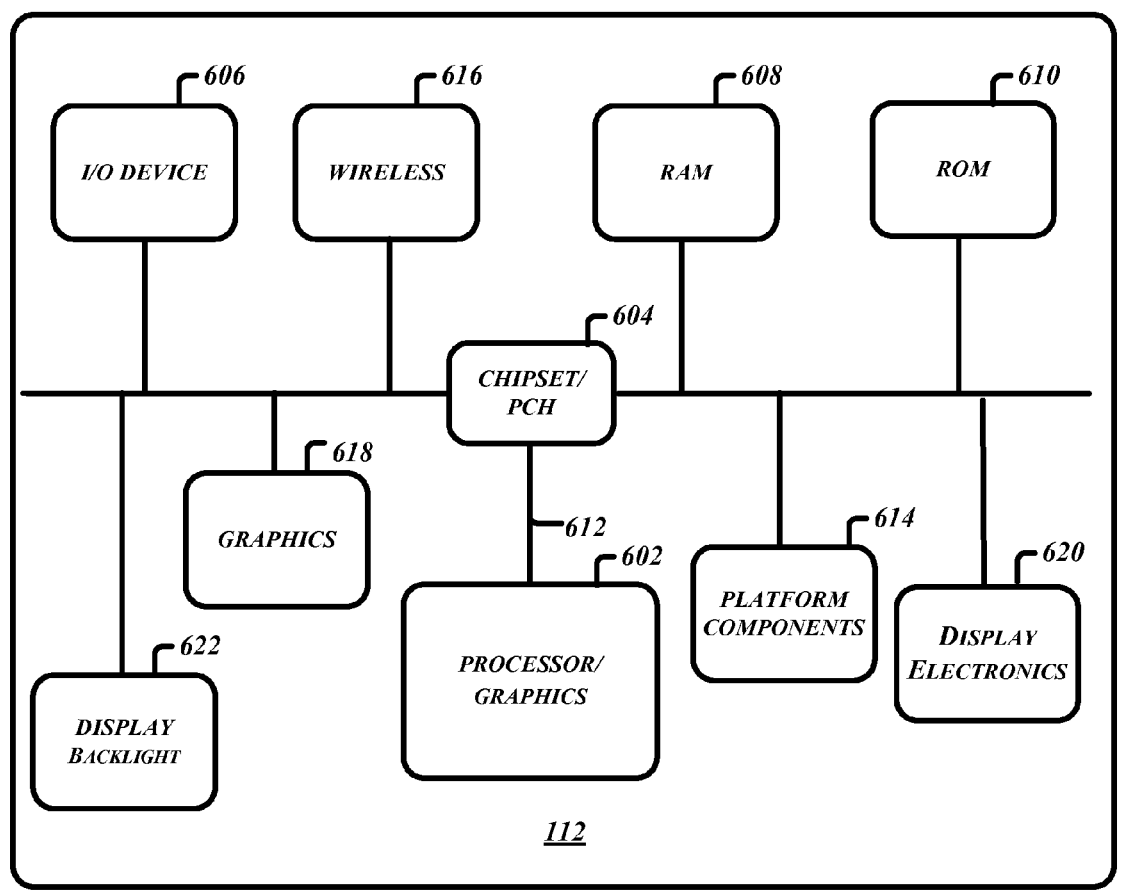
FIG. 1b illustrates one embodiment of a device platform.

FIG. 1b is a diagram of an exemplary system embodiment, which may be an embodiment of device platform 112. In particular, FIG. 1b is a diagram showing a platform 112, which may include various elements. For instance, FIG. 1b shows that platform (system) 112 may include a processor/graphics core 602, a chipset/platform control hub (PCH) 604, an input/output (I/O) device 606, a random access memory (RAM) (such as dynamic RAM (DRAM)) 608, and a read only memory (ROM) 610, display electronics 620, display backlight 622, and various other platform components 614 (e.g., a fan, a crossflow blower, a heat sink, DTM system, cooling system, housing, vents, and so forth). System 112 may also include wireless communications chip 616 and graphics device 618. The embodiments, however, are not limited to these elements.

As shown in FIG. 1b, I/O device 606, RAM 608, and ROM 610 are coupled to processor 602 by way of chipset 604. Chipset 604 may be coupled to processor 602 by a bus 612. Accordingly, bus 612 may include multiple lines.

Processor 602 may be a central processing unit comprising one or more processor cores and may include any number of processors having any number of processor cores. The processor 602 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 602 may be multiple separate processors located on separate integrated circuit chips. In some embodiments processor 602 may be a processor having integrated graphics, while in other embodiments processor 602 may be a graphics core or cores.

Referring again to FIG. 1a, in accordance with various embodiments, a system such as system 112 may be operated in various power modes using a configurable power knob 104. The power knob may provide downward scalability of power and thermal output of a system. In various embodiments, using a configurable power knob, the active power used by one or more devices in a device platform may be either downscaled or upscaled according to a current power mode of the device platform. For example, when a system is operating at a turbo ("Standard") mode in which active power is at a maximum, power downscaling to modes such as "Reduced Power," "Cool Running," "ULP," or other modes may be used as desired to reduce skin temperature, reduce exhaust air temperature, reduce fan noise. When a system is operating at a reduced power mode, and the benefits of reduce power mode are no longer needed or desired, such as reduced temperature or noise, the configurable knob can be turned back to "Standard."

In various embodiments, the knob 104 may represent a multiplicity of knobs that each provides the capability of changing parameters associated with one or more devices of a device platform so as to vary the operation of the device platform between a multiplicity of power modes. Embodiments of individual knobs are described further below and may include, among others: a knob to select the number of cores of a multicore processor to be utilized in an active state in order to limit power/heat dissipation; a knob to vary I/O bandwidth in a device platform; a knob to particularly select a subset of I/O paths and/or channels, whether representing a subset of different devices or duplicate paths; a knob to select a subset of cores of a graphics processor to be utilized; and a knob to select a subset of any multi-state, path, engine, parallel, or device operable over a variable range for purposes of providing a selection of discrete power dissipation levels.

Figure 1C:
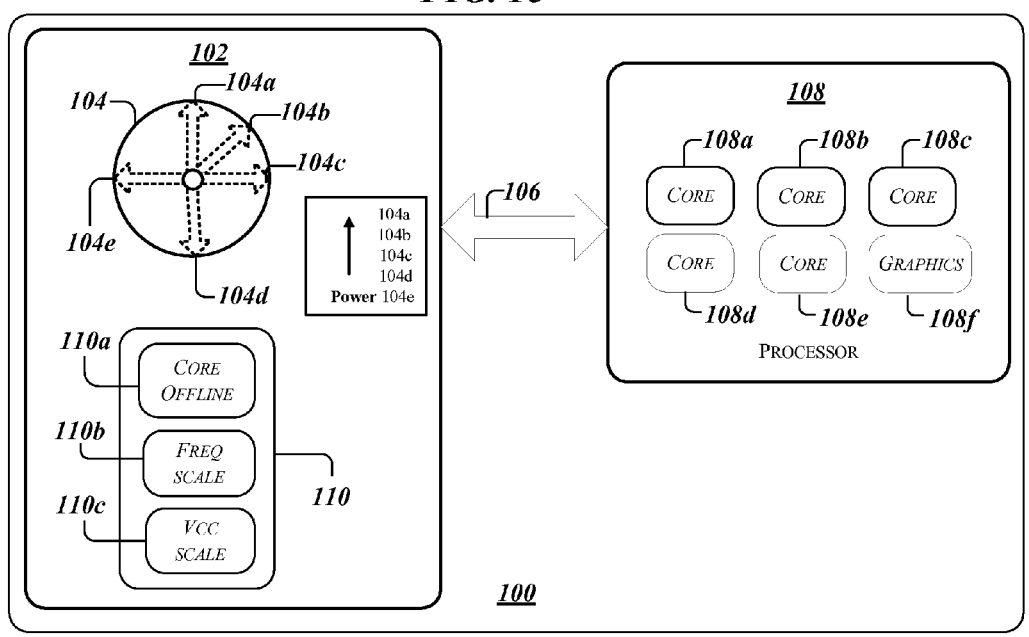
FIGS. 1c-e illustrate embodiments of another power management system.

FIG. 1c depicts a power management system 100 embodiment for controlling power modes in a processor 108. The power management module 102 may be operable to vary the operating conditions in a set of processor devices 108a-f. The power management module may be linked to processors 108 through link 106, which may represent a series of individual links. In some embodiments, power management module 102 may include the power knob 104 that includes a multiplicity of power levels, or settings, 104a-e. In some embodiments, the power knob 104 may be composed of elements such as a user interface to receive input, a program or applet, a memory device, and a processor.

In particular, the power knob 104 may be operable to receive manual input through an interface so as to change the power settings between various levels 104a-e. In some embodiments, the power levels 104a-e may be identified to a user through an interface. In some embodiments, the identifiers may include information indicative of the device configuration(s) applicable to a given power mode, such as a "single core" mode, or a low frequency mode, or a low voltage mode.

As illustrated in FIG. 1c, power management module 100 may include a set of programs 110 (or applets, or instructions) which, when executed, cause changes in operation of processor cores 108. In accordance with some embodiments, selection of a power mode 104 may be associated with execution of one or more of programs 110a (CORE OFFLINE), 110b (FREQUENCY SCALE), or 110c ($V_{CC}$ SCALE), which may alter operation of processor cores 108, as described further below. In other embodiments, programs 110 may include other programs for controlling other operations of processor cores 108. Although depicted as separate, in some embodiments programs 110 may be included in power knob 104.

In some embodiments, the power knob may be embedded in software, such as an operating system used to control operation of a device platform that may include processor 108. Control of the power knob may be provided through interface(s) consistent with other programs in the operating system. In this manner, a user may access the power knob through a familiar interface to facilitate control of downscaling or upscaling power of devices in the device platform.

Notably, in some embodiments, the power management module 102, as well as programs 110 may be at least may be partially embodied in a processor, such as processor 108. Thus, links depicted between power management module 102 and processor 108 elements may be internal to the processor in some embodiments.

In particular, power knob 104 may be used to select a multiplicity of power modes (levels) that may govern operation of one or more cores (which may include one or more graphics cores 108f) in multi-core processor 108. In some embodiments, selection of a given power level (mode) may set a maximum operating power for a given set of devices, such as the cores of multi-core processor 108. Thus, for example, mode 104a may correspond to a default "turbo mode" (which may be designated as "Standard" as depicted in FIG. 1a) operation in which all cores 108a-f of multi-core processor 108 are operable and are set to run at maximum Vcc and maximum frequency. In this mode, multi-core processor 108 may execute programs and perform tasks at a maximum designed level, which may also generate a maximum thermal output. For example, in the "turbo mode" the cores 108a-f may remain in active state for the greatest amount of time, and may consume the most power in active state because of the high processor voltage and high clock speed.

Figure 1D:
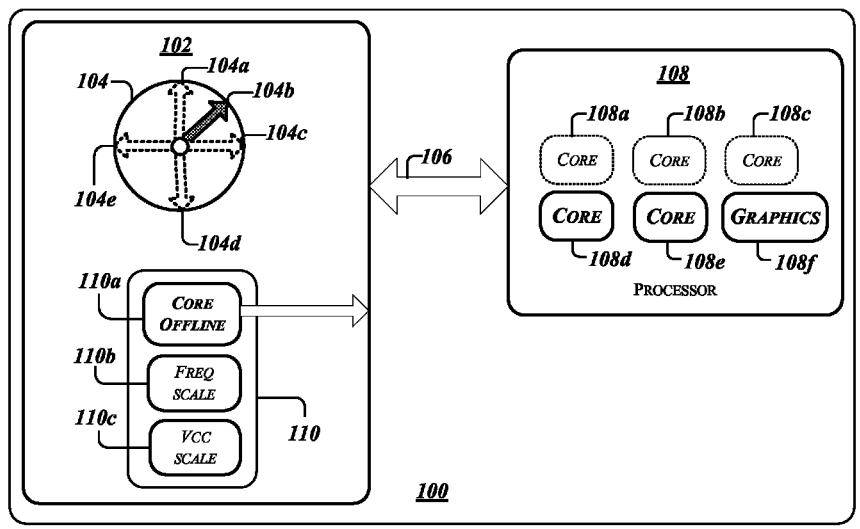

FIG. 1d depicts one embodiment of power management module 102, in which a power mode 104b is selected, which may correspond to a lower power state than the turbo mode 104a. Mode 104b may be selected, for example, to reduce heat output in a device platform, such as a notebook computer. Accordingly, use of mode 104b may result in a lower skin temperature of the notebook, leading to a more ergonomic user experience than that experienced when operating under turbo mode. Alternatively, or in addition, use of mode 104b may require less fan speed to cool a notebook computer resulting in less noise and thereby a more pleasant user experience.

As illustrated in FIG. 1d, selection of mode 104b may cause instruction 110a to be executed, which results in a core offlining operation. In the example of FIG. 1d, cores 108a-c may be offlined, while cores 104d-f remain in an active mode. Offlining of cores 108a-c may result in substantial reduction of power in processor 108 since the cores 108a-c may consume minimal or no power while in an off-lined state. Accordingly, an end user or OEM party may configure system 100 to operate in mode 104a to reduce heat when it is contemplated that processor 108 may perform adequately for a user's purposes in a partially offlined state.

Figure 1E:
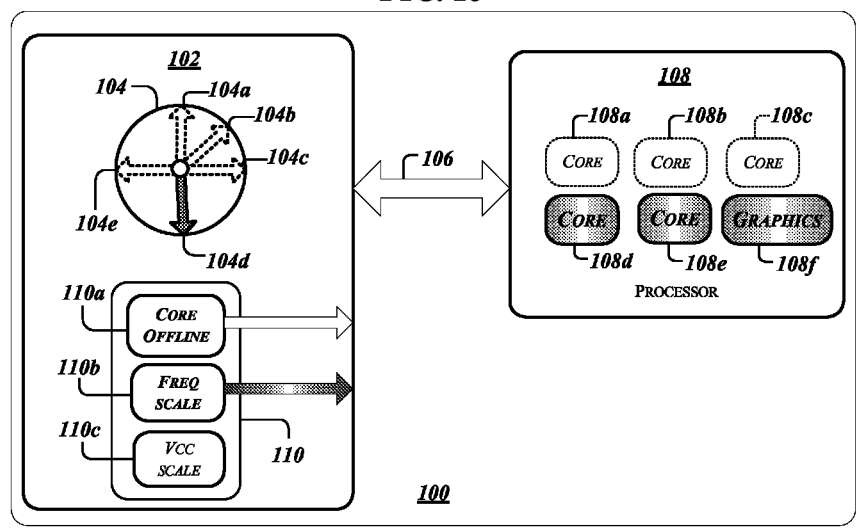

In some embodiments, the heat output from processor 108 may be further downscaled by selecting other modes, such as modes 104c-e. As illustrated by FIG. 1e, selection of other power modes may cause further changes in operation of processor 108. When power knob 104 selects "Cool Running" mode 104d, the operation of processor cores 108a-f may undergo a combination of changes. In the first place, cores 108a-108c may be offlined as in mode 104b. In addition, remaining active cores 108d-f may receive a signal or instruction to downscale the processor frequency to a lower value than that of turbo mode 104a, as indicated in FIG. 1c. This combination of changes may further reduce power below that in mode 104b, for example.

In various embodiments, the system 100 may automatically establish a set of operating changes in processor 108 in response to a selection of power level by knob 104. In other words, when a user selects a power mode, such as 104b or 104d, operations such as core offlining 110a and frequency scaling 110b (or $V_{CC}$ scaling 110c) are automatically performed without user input.

Figure 2A:
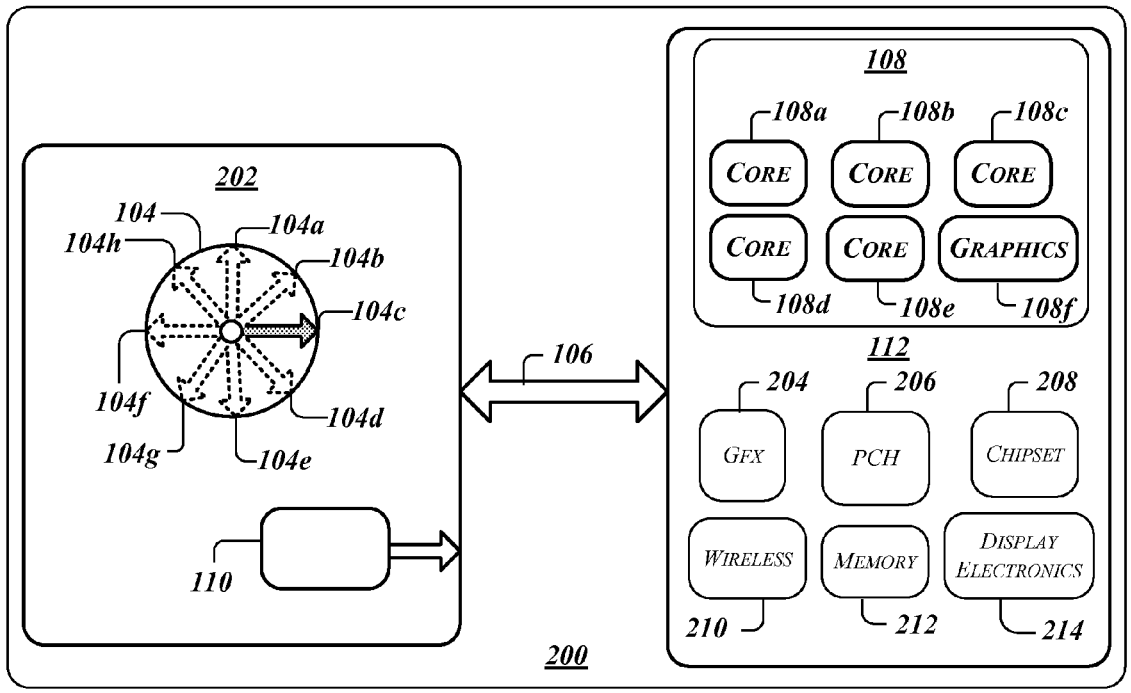
FIGS. 2a-b illustrate embodiments of a further power management system.

In various embodiments, a power management system may provide additional device platform power levels by providing for downscaling operation of devices in addition to a processor. FIG. 2a depicts another power management system embodiment 200 that provides additional power modes besides those depicted in FIGS. 1a-e. System 200 contains a power management module 202 that may be used to manage power in device platform 112 through link 106. Device platform 112 may include, in addition to processor 108, graphics processor 204, platform control hub (PCH) 206, wireless device 210, memory 212, and display electronics 214. Platform 112 may also include a separate chipset 208 and other devices, such as I/O devices (not shown).

As shown in FIG. 2a, power knob 104 may include additional modes 104g, 104h. In the particular scenario depicted in FIG. 2a, a mode 104c may be selected, which may cause a change in the active power level in processor 108. In one example, selection of "Reduced Power" mode 104c may cause program set 110 to send instructions to place all of cores 108a-108f into lower frequency operation, in which the maximum processor frequency is lower than that of the turbo mode 104a. In another example, selection of mode 104c may initiate a low voltage mode for all processor cores 108a-f. For example, selection of mode 104c may cause program set 110 to send instructions to place all of cores 108a-108f into lower $V_{CC}$ active mode, in which $V_{CC}$ is lower than in turbo mode 104a.

Figure 2B:
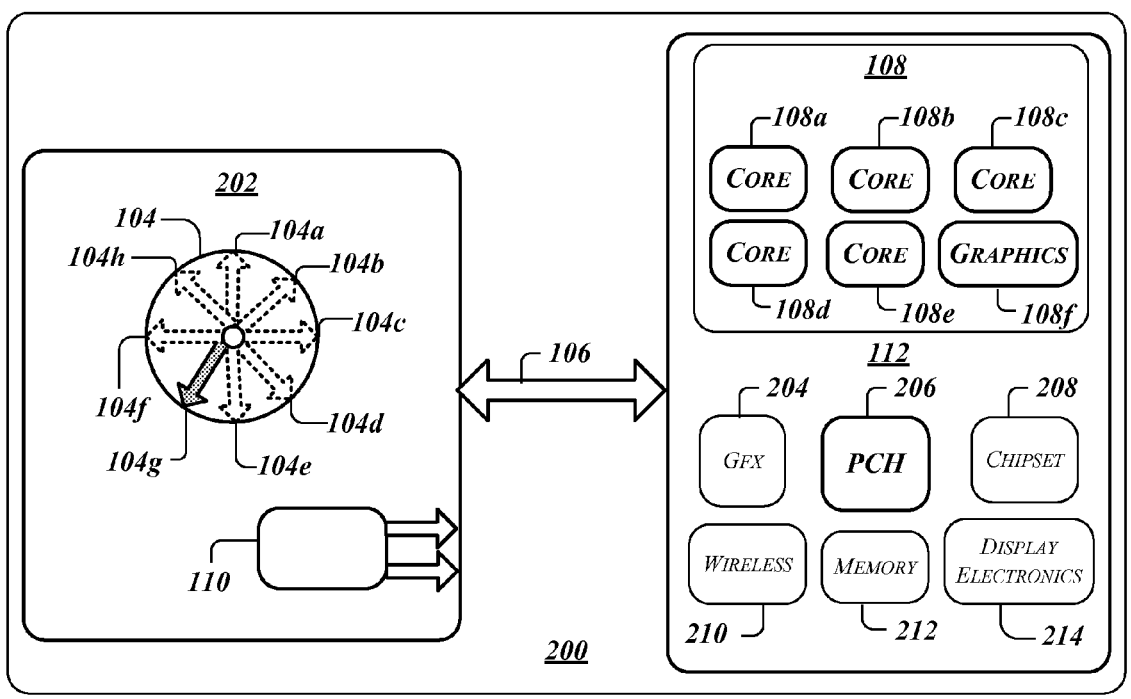

In some embodiments, the additional power modes may involve changes to the operation of one or more of devices 108 and 204-214. FIG. 2b depicts one embodiment in which power mode 104g is selected, which may further downscale the power level (and therefore the thermal output) in device platform 112 as compared to "Reduced Power" mode 104c. In one embodiment, power management module 202 may invoke a first operation 110 to downscale frequency in cores 108a-f and a second operation to downscale frequency in a controller device, such as PCH 206.

In various other embodiments power knob 104 may contain other power modes that involve operating power changes in other devices among devices 204-214.

Figure 3:
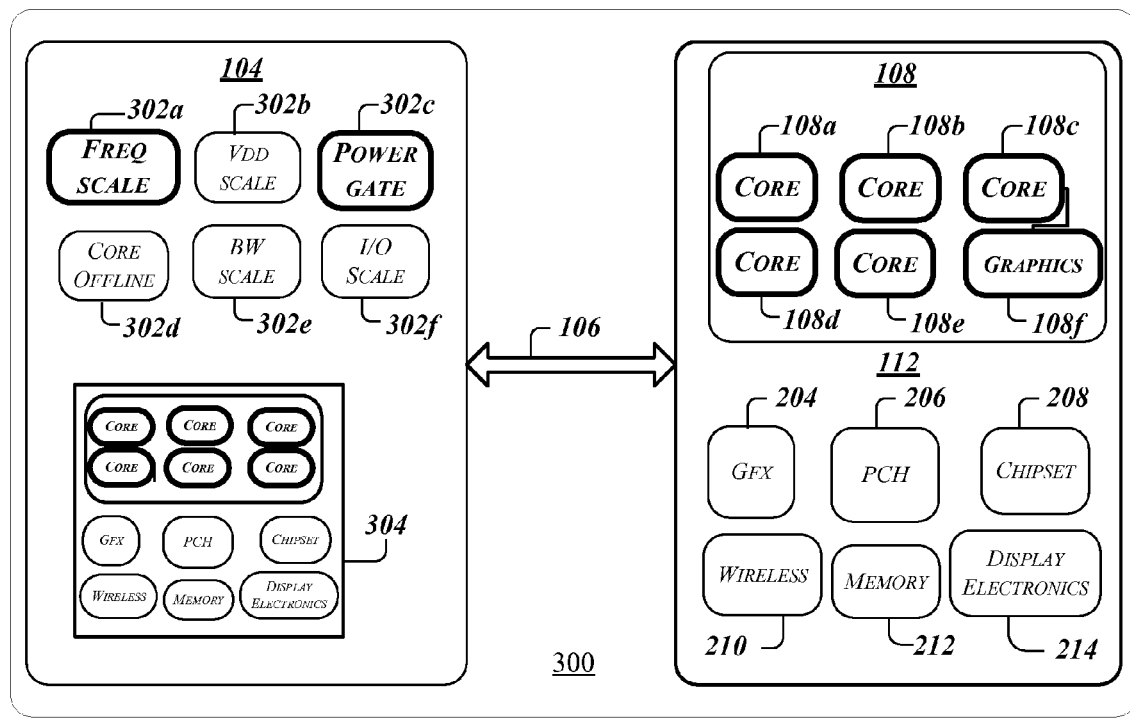
FIG. 3 illustrates one embodiment of another power management system.

FIG. 3 illustrates another power management system embodiment 300, in which power saving operations may be independently selected for individual devices of a device platform. In this embodiment, power knob 104 may provide a user with the ability to individually select devices for power downscaling. In some embodiments, a listing or other indication of user-configurable devices may be provided, or a device platform map 304 may be provided, as illustrated in particular in FIG. 3. A device platform map or other similar menu may include a set of selectable items that correspond to devices in device platform 112 that are available for power downscaling. Power knob 104 may also include a set of power downscaling operations 302a-f, which may be individually selected in some embodiments. In some embodiments, a user may employ knob 104 to select a device or set of devices, such as processor/integrated graphics cores 108a-f. Once selected, one or more of power downscaling operations (programs) 302a-f may be selected for application to the selected device.

In some embodiments, one or more of the programs may each comprise part of a separate configurable knob, such that a multiplicity of settings may be provided by the individual program. Thus, a core offlining program 302d may provide selections such as 2, 3, or 5 corresponding to the number of processor/graphics cores to be offlined. In some embodiments, one or more graphics cores may be selectively offlined. For example, program 302d may include rules as to priority for off-lining cores according to the type of core. In another embodiment, a frequency scaling program 302a may offer a multiplicity of lower operating frequencies for the designated processors.

In the specific scenario depicted in FIG. 3, frequency scaling and power gating 302c are selected for application to core processors 108. This procedure or another appropriate procedure may be repeated for other devices in device platform 112.

In some embodiments, other operations such as bandwidth (BW) scaling 302e or I/O scaling 302f may be applied to the appropriate devices of a device platform. In one embodiment selection of BW scaling 302e may provide a multiplicity of selections of reduced input/output bandwidth modes for operating platform 112. Each mode may provide a different bandwidth level for signals communicated to I/O devices (see element 606 of FIG. 1b) of platform 112. In another embodiment, selection of I/O scaling 302f may provide a multiplicity of different power modes corresponding to different levels of availability of I/O devices and/or paths. The selection of an I/O power mode may be performed for the purposes of tailoring a device to the immediate environment at hand. In one example, the lower power mode may be selected in which a subset of I/O devices and paths are placed in an unavailable state in which paths/I/O devices are closed. This may take place when the thermal environment of a device platform may require thermal downscaling, such as when the amount of heat dissipation (or temperature) in a portion of the device platform or in the whole device platform exceeds a threshold. Subsequently, a high power mode may be resumed in which paths/I/O devices are reopened when the thermal environment changes to permit increased availability of the I/O system Notably, not all operations 302a-f may be applicable to all devices of a device platform. In some embodiments, system 300 may determine which of operations 302a-f are permissible according to the device selected.

In some embodiments, the system 300 may be employed by a user to establish a set of operating power modes for a device platform. For example an original equipment manufacturer (OEM) or original equipment designer (ODM) may wish to provide end users a set of selectable power modes for operating a device platform sold by the OEM/ODM. The OEM may accordingly configure a device, such as device 108 using system 300, such that a set of low power modes are established for operation of device 108. Each different mode may correspond to a different combination of cores 108a-f and power saving operations 302-a-f that are configured by the OEM. Once established, these modes may be provided as different selectable settings of a power knob 104, for example, settings 104a-h of FIG. 2. In some embodiments, the end user may then access power knob 104 through an interface that provides the selectable power modes 104a-h without necessarily providing the "menu" items 302a-f, 304 that are used to establish the power modes.

In various embodiments, the platform devices whose operation is configurable using knob 104 may be a subset of all devices in a device platform such as a computer, a portable computer, a portable communication device, a portable entertainment device, or other electronic device.

In various embodiments a user is provided with multiple power levels for running a device platform that may be selected and deselected according to the user's needs. In some embodiments, a power management system may be arranged so that any number of power levels may be established by a user. For example, a user may be provided with a pre-established set of power modes in a configurable knob, but may wish to add further power modes. The user may wish to downscale power to power modes lower than those provided in the initial power modes, which may be accomplished in accordance with the procedures outlined with respect to FIG. 3.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a device platform comprising a first device and a second device, the first device and the second device each arranged to operate in multiple power modes, the first device comprising a processor with multiple cores, the second device comprising one or more of a processor having a graphics core, an I/O device, a graphics controller, a memory, a wireless communication device, an I/O device controller, or display electronics; and
a power knob comprising a user interface element arranged to provide multiple power mode selections for the first device and the second device, the multiple power mode selections to include at least one low power mode in which the first device and the second device operate at a lower power than in a high power mode and in which at least a first one of the multiple cores is to operate under a first operating mode and at least a second one of the multiple cores is to operate under a second operating mode while the low power mode is selected, the first operating mode different than the second operating mode.

2. The apparatus of claim 1, the processor comprising one or more of: multiple processor cores and multiple graphics cores.

3. The apparatus of claim 2, the processor comprising a single chip.

4. The apparatus of claim 2, comprising at least one low power level in which at least one of the multiple cores of the processor is placed in an off-line state while the low power mode is selected.

5. The apparatus of claim 1, comprising one or more programs arranged to reduce operating power in the processor when the power knob performs a selection of a low power mode.

6. The apparatus of claim 5, the programs including one or more of: a core offlining program, a low frequency program, a low voltage program, and a power gating program.

7. The apparatus of claim 1, the power knob comprising a user interface element in a device platform that includes the processor.

8. A system, comprising:
a first device and a second device in a device platform each of the first and second devices being configurable to operate in multiple power modes, wherein the first device comprises a processor with multiple cores and the second device comprises one or more of a processor having a graphics core, an I/O device, a graphics controller, a memory, a wireless communication device, an I/O device controller, and display electronics; and
a power management module that includes a knob comprising a user interface element arranged to provide a selection of at least one low power mode in which the first and second devices are to operate at a lower power than in a first power mode and in which a first one of the multiple processor cores is to operate under a first operating mode and a second one of the multiple processor cores is to operate under a second operating mode while the low power mode is selected, the first operating mode different than the second operating mode.

9. The system of claim 8 comprising a processor that is one of: a multicore processor, multiple single-core processors, and multiple multicore processors.

10. The system of claim 8, the power knob comprising a set of programs arranged to reduce operating power in one or more device when the power knob performs a selection of a low power mode, the set of programs comprising one or more of:
- a core offlining program to remove one or more devices of the set of devices from active operation;
- a low frequency program to reduce frequency of operation of one or more devices of the set of devices;
- a low voltage program to lower supply voltage to one or more devices of the set of devices;
- a power gating program;
- an I/O scaling program that provides a multiplicity of different I/O power modes that each correspond to a different level of availability of input output devices and/or paths in an input/output system of the device platform; and
- a bandwidth scaling program that provides a multiplicity of power modes corresponding to different input/output bandwidth levels for operating the device platform.

11. The system of claim 8, the power knob comprising a user interface element arranged to accept user selection of at least one low power mode.

12. The system of claim 8, the power knob embedded in an operating system used to control the device platform.

13. The system of claim 11, comprising an interface arranged to provide individual selectability of the programs and of the set of devices.

14. The system of claim 11, wherein the power knob is to provide user-configurable power levels that are each set by selection of one or more devices, one or more programs, or a combination of the two.

15. The system of claim 10, the I/O scaling program arranged to trigger between a low power mode in which one or more devices of the device platform is made unavailable and a high power mode in which all devices are available, according to a level of heat dissipation in the device platform.

16. An article comprising a non-transitory computer-readable storage medium containing instructions that if executed by a processor enable a system to:
- receive a selection of a low power mode of operation for a first device and a second device in a device platform from a knob comprising a user interface element arranged to provide a selection of the at least one low power mode in a system that is arranged to operate in multiple power modes, the first device comprising a processor with multiple cores and the second device comprising one or more of a processor having a graphics core, an I/O device, a graphics controller, a memory, a wireless communication device, an I/O device controller, and display electronics;
- initiate operation of the first and second devices in the low power mode based on the received selection; and
- place a first one of the multiple processor cores in a first operating mode and a second one of the multiple processor cores in a second operating mode based on the received selection, the first operating mode different than the second operating mode.

17. The article of claim 16, comprising instructions that if executed enable the system to perform one or more of:
- remove one or more cores of a multicore processor from active operation;
- reduce frequency of operation of at least one device;
- lower supply voltage to at least one device;
- provide power gating to at least one device;
- reduce a number of available input/output devices in the system; and
- provide a lower input/output bandwidth to the system.

18. The article of claim 16, comprising instructions that if executed enable the system to receive individual selection of one or more devices, and to receive selection of one or more executable programs for operating at least one device in a low power mode.

19. The article of claim 18, comprising instructions that if executed enable the system to store an executable power mode based on receipt of a selection of one or more devices, an of the one or more executable programs.

* * * * *